(12) United States Patent
Valliappan et al.

(10) Patent No.: US 8,751,880 B2
(45) Date of Patent: Jun. 10, 2014

(54) APPARATUS AND METHOD TO MEASURE TIMING MARGIN IN CLOCK AND DATA RECOVERY SYSTEM UTILIZING A JITTER STRESSOR

(75) Inventors: Magesh Valliappan, Austin, TX (US); Lin Zheng, Newark, CA (US); Bruce Howard Conway, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 46 days.

(21) Appl. No.: 13/341,614

(22) Filed: Dec. 30, 2011

(65) Prior Publication Data

US 2013/0091392 A1   Apr. 11, 2013

Related U.S. Application Data

(60) Provisional application No. 61/545,781, filed on Oct. 11, 2011.

(51) Int. Cl.
*G11B 20/20* (2006.01)

(52) U.S. Cl.
USPC .................................................. 714/700

(58) Field of Classification Search
USPC .................................................. 714/700
See application file for complete search history.

(56) References Cited

U.S. PATENT DOCUMENTS

| | | | |
|---|---|---|---|
| 7,243,272 B2 * | 7/2007 | Tarango et al. | 714/700 |
| 7,558,991 B2 * | 7/2009 | Mattes et al. | 714/700 |
| 7,853,836 B2 * | 12/2010 | Takada | 714/700 |
| 8,074,125 B2 * | 12/2011 | Lee | 714/700 |
| 8,074,126 B1 * | 12/2011 | Qian et al. | 714/704 |
| 8,453,019 B2 * | 5/2013 | Newcomb et al. | 714/704 |

* cited by examiner

*Primary Examiner* — James C Kerveros
(74) *Attorney, Agent, or Firm* — Sterne, Kessler, Goldstein & Fox P.L.L.C.

(57) ABSTRACT

A method and a system for accurately calculating the timing margin in a clock and data recovery system (CDR) is provided that utilizes a singular path environment of hardware. The method entails adding an amount of jitter within the CDR to change the receiver phase. The amount of jitter is incrementally increased until a threshold level of bit errors occur. Based on the amount of jitter needed to cause the threshold level of bit errors, timing margin can be calculated.

22 Claims, 9 Drawing Sheets

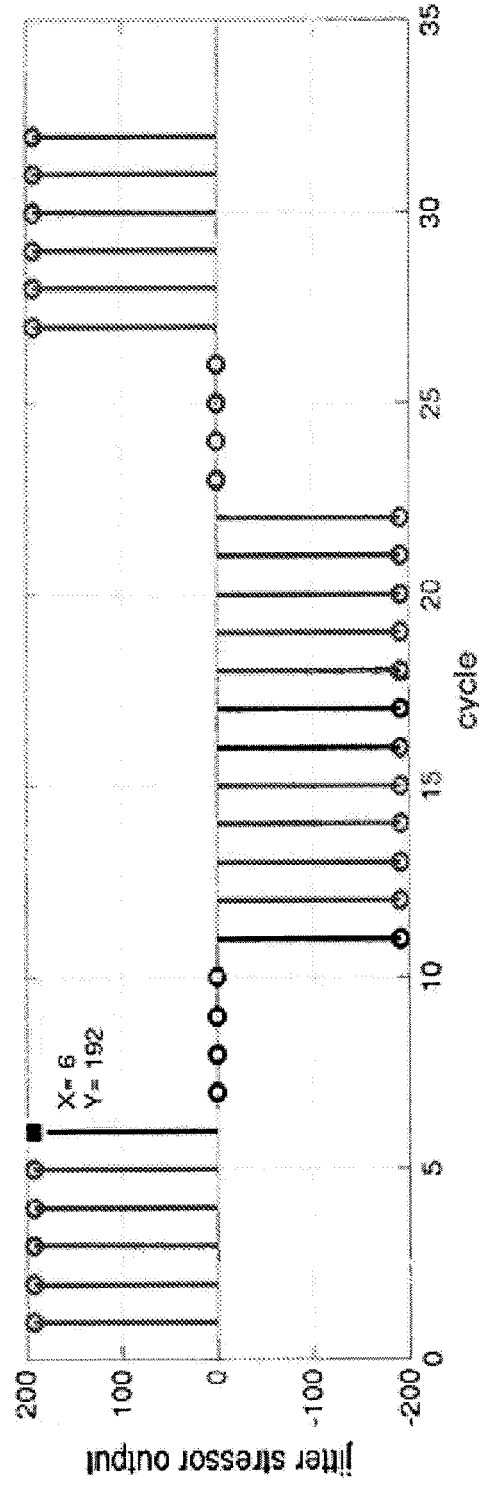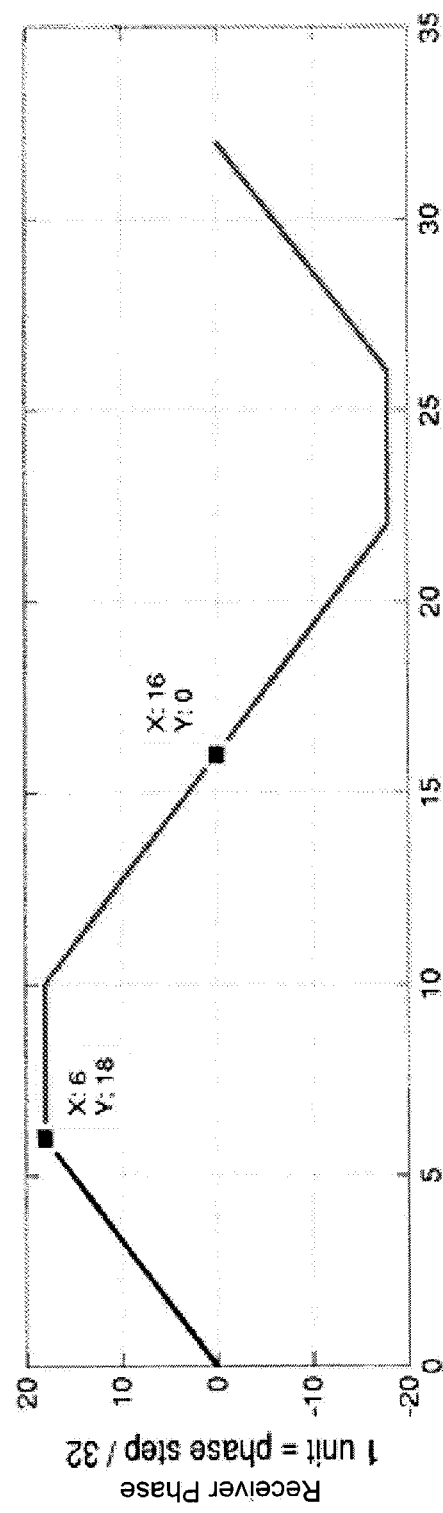
FIG. 4A
FIG. 4B

APPARATUS AND METHOD TO MEASURE TIMING MARGIN IN CLOCK AND DATA RECOVERY SYSTEM UTILIZING A JITTER STRESSOR

CROSS-REFERENCE TO RELATED APPLICATIONS

The present application claims the benefit of U.S. Provisional Patent Appl. No. 61/545,781, filed Oct. 11, 2011, which is incorporated by reference herein in its entirety.

FIELD OF THE INVENTION

The invention relates generally to calculating reliability in high speed digital communication environments, and more particularly, to determining reliability by utilizing techniques for measuring timing margin in a clock and data recovery system utilizing a jitter stressor.

BACKGROUND

In some high speed data links, digital data streams are sent from one communications node to another without an accompanying clock signal. Clock and Data Recovery (CDR) circuits are therefore utilized to recover data and timing information from a received signal. Typically, the CDR will extract a clock from the received signal, predict the location of the center of an "eye" diagram and sample data from the predicted center of the eye. Accordingly, there is a need to measure the timing margin of the CDR so that a manufacture or user, can characterize the performance of the CDR, and its effect on bit error rate (BER).

If the CDR is not functioning accurately, it leads to increased bit errors during data recovery because the data is not being sampled in the center of the eye. It is important for an end-user utilizing a particular CDR to know how well the CDR functions in terms of accuracy, and its timing margin before the CDR fails. For example, in a 5 GHz transmission system, the data or an eye may be 200 picoseconds wide and the CDR should be sampling in the middle. However, if the CDR samples off-center, then the probability of bit errors due to noise, etc., increases the farther the CDR samples from the center of the eye diagram. Timing margin characterizes how close to the center of the eye the data is being sampled. If the CDR is well centered, the system should be able to withstand a move of the phase (i.e. sampling time) to the left or the right from center, and still function with acceptable BER, indicating that the system has a good timing margin.

In a typical approach to measuring timing margin, a main detector operates in a primary data path, and a second detector is utilized in a secondary data path, which is operating in parallel with the primary data path. The main detector recovers data and the second detector is utilized to estimate the timing margin. Essentially, data is recovered from the first data path by sampling the data at the center of the eye (or as close to it as can be achieved). A second data path having the second detector simultaneously samples the same data. However, a phase offset is deliberately added to the sampling time of the second detector so as to sampling performed offset from the center of the eye diagram, relative to the first detector. After receiving the results of the first path and the second path, the user is able to compare the sampled results and determine the phase offset that results in an unacceptable BER, which then defines the timing margin. A disadvantage of this approach is the need for two separate data paths and the requisite duplicate hardware. Another typical approach entails the use of one path for clock recovery and another path for data recovery. The similar disadvantage for this approach is the need for at least partially duplicate hardware in such a system.

What is needed is an apparatus and method for measuring timing margin that does not require duplicate hardware.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the disclosure. In the drawings:

FIGS. 4-7 illustrate jitter waveforms and their effects on the phase of the respective receivers according to exemplary embodiments of the present disclosure.

The present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
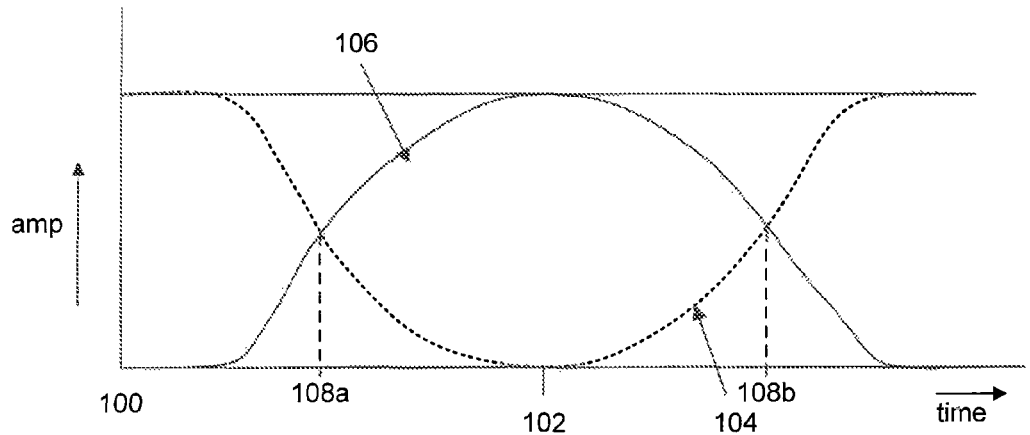
FIG. 1 illustrates a first sampling diagram of a digital data signal according to an exemplary embodiment of the present disclosure.

FIG. 1 illustrates a first sampling diagram of a digital data signal according to an exemplary embodiment of the present disclosure. A first sampling diagram 100 illustrates a graphical display of samples of the digital data signal over multiple samples that are overlaid on each other to form an "eye diagram". The eye diagram as illustrated in FIG. 1 is for illustrative purposes only; those skilled in the relevant art(s) will recognize that the samples of the digital data signal may form different eye diagrams without departing from the spirit and scope of the present disclosure, or may be represented in a different manner. Typically, the digital data signal is in a form of logic values based on the binary number system. The two symbols most commonly chosen to represent the two logic values taken on by binary symbols are binary zero and binary one. The eye diagram illustrates logical zeros 104 of the digital data signal superimposed onto logical ones 106 of the digital data signal, that are collected or sampled over time.

A receiver (not illustrated in FIG. 1) optimally samples the digital data signal at an optimal sampling time 102. When the digital data signal is sampled at the optimal sampling time 102, the probability of erroneously estimating the digital data signal is minimized. The optimal sampling time 102 represents an instance in time whereby an opening of the eye diagram is at its maximum. Typically, the opening of the eye diagram is at its maximum when an amplitude of the logical zeros 104 are at their minimum and an amplitude of the logical ones 106 are at their maximum, which is at the center (time 102) of the eye diagram as shown.

Figure 2:
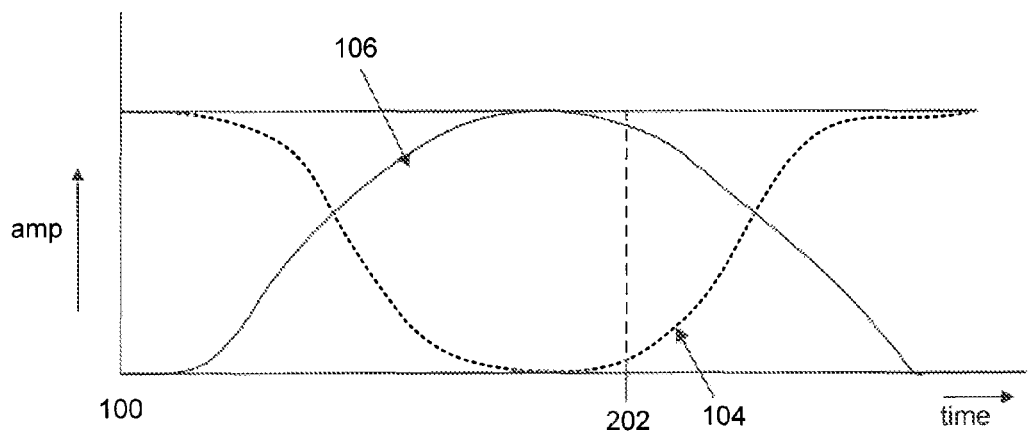
FIG. 2 illustrates a second sampling diagram of the digital data signal according to a second exemplary embodiment of the present disclosure.

FIG. 2 illustrates a second sampling diagram of the digital data signal according to a second exemplary embodiment of the present disclosure. A second sampling diagram 200 illustrates a substantially similar eye diagram of the logical zeros 104 and the logical ones 106 of the digital data signal. However, a receiver (not illustrated in FIG. 2) samples the digital signal at a suboptimal sampling time 202. The suboptimal sampling time 202 represents an instance in time whereby the opening of the eye diagram is not at its maximum. Typically, when the suboptimal sampling time 202 occurs before the maximum of the eye diagram it is referred to as being "early", and when the suboptimal sampling time 202 occurs after the maximum of the eye diagram (as shown) it is referred to as being "late". Due to the suboptimal sampling in FIG. 2, the amplitude of the binary ones decreases and the amplitude of the logic zeros increases, which increases the likelihood of a bit error in sampling the digital data as discussed below.

When the digital data signal is sampled at the suboptimal sampling time 202, the probability of erroneously estimating the digital data signal is greater than the probability of erroneously estimating the digital data signal when it is sampled at the optimal sampling time 102. The increase in BER is essentially due to noise that may distort the amplitude of the data signal, and therefore cause a logic "1" to be measured as a logic "0", and vice versa. Noise will cause the eye diagram to appear to incrementally "close", as logic ones with relatively low signal amplitude overlap with logic zeros having relatively high signal amplitude. In such a noisy environment, the probability of elevated BER increases as a distance between the suboptimal sampling time 202 and the maximum of the eye diagram increases.

Noise within the receiver, such as jitter to provide an example, may effect where the digital data signal is sampled. Jitter is the general term used to describe the noise or uncertainty in the period of the digital signal in a communications system. In an ideal system, bits of the digital signal arrive at time increments that are integer multiples of a bit repetition time. However, in a real-world system, the bits of the digital signal arrive at times that deviate from these integer multiples. This deviation may cause errors in the transmission of data, particularly when the data is transmitted at high speeds (e.g. GHz, and above). The deviation or variation may be in the amplitude, frequency, or phase of the data. Jitter may occur due to a number of causes, including inter-symbol interference, frequency differences between the transmitter and receiver clocks, channel noise, and the non-ideal behavior of the receiver and transmitter clock generation circuits.

Jitter is a problem of particular importance in digital communications systems. First, jitter causes the digital signal to be sampled at a suboptimal sampling time. This occurrence reduces the signal-to-noise ratio at the receiver and thus limits the information rate. Second, in conventional systems, each receiver typically extracts it's receive sampling clock from the digital data signal, as a separate clock signal is not transmitted. Jitter makes this task significantly more difficult leading to inaccurate extraction of the receiver sampling clock. The inaccurate extraction of the sampling clock causes inaccurate data sampling that increases the number of bit errors.

Accordingly, with respect to the present disclosure, an artificial amount of jitter may be added to skew the phase of the receiver sampling clock to determine the impact of the jitter on data recovery by the receiver, and thereby measure the timing margin of the CDR.

Figure 3:
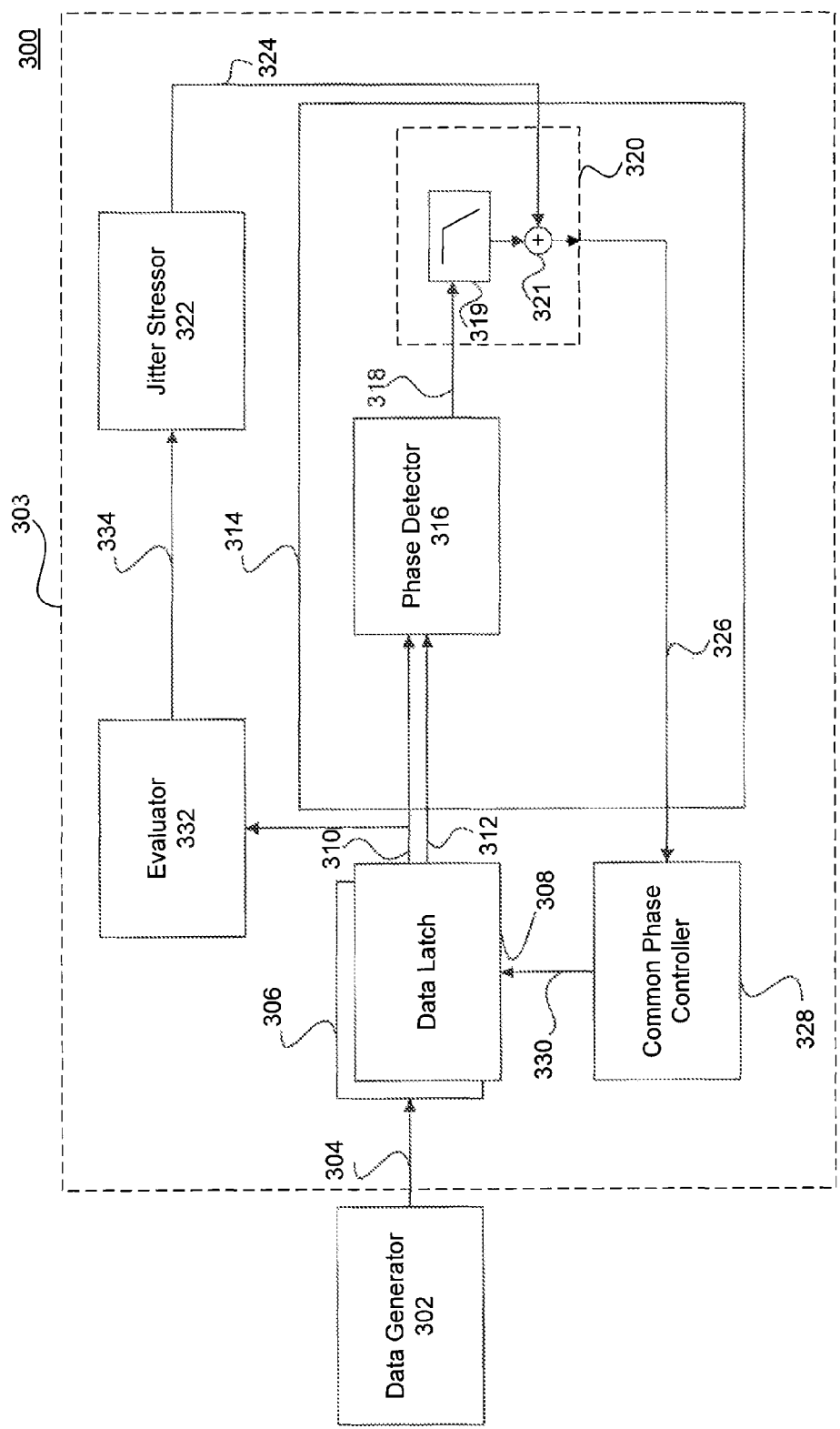
FIG. 3 illustrates a block diagram of a timing margin calculation system according to an exemplary embodiment of the present disclosure.

FIG. 3 illustrates a block diagram of a timing margin calculation system according to an exemplary embodiment of the present disclosure. A timing margin calculation system 300 introduces jitter into its sampling clock to determine a timing margin of the system. The timing margin of the digital signal represents a window of sampling times for which the timing margin calculation system 300 may sample the digital signal to accurately detect its logic values within an acceptable BER. Typically, the window of sampling times is centered about an optimal sampling time of the digital signal. The jitter introduced into the sampling clock is increased until the timing margin calculation system 300 produces an unacceptable BER while sampling the digital signal.

The timing margin calculation system 300 includes a data generator 302 and receiver 303. The receiver 303 further includes a first data latch 306, a second data latch 308, a clock and data recovery (CDR) module 314, a jitter stressor 322, a phase controller 328, and an evaluator module 332. The data generator 302 provides a digital signal 304 to the first data latch 306 and the second data latch 308. The digital signal 304 may represent a sequence of logical ones and zeros that are a priori known, commonly referred to as a training sequence, to the receiver 303. Alternatively, the digital signal 304 may represent a pseudo-random or a random sequence of the logical ones and zeros that can be determined or reproduced, with near-absolute certainty, by the timing margin calculation system 300.

The first data latch 306 samples the digital signal 304 in accordance with a sampling clock 330 to provide an estimated digital sequence 310. In an exemplary embodiment, the first data latch 306 may be implemented as a data slicer that estimates logic levels that are represented by the digital signal 304. The first data latch 306 estimates whether the digital signal 304 is the logical one or the logical zero in accordance with the sampling clock 330. The first data latch 306 may provide this estimate when the sampling clock 330 is at a rising edge, a falling edge, or a steady state.

The second data latch 308 identifies the location, in time, of the "edges" 108 of the eye diagram of the digital signal 304, so as to provide an edge sequence 312. As illustrated, the edges 108 are located approximately at the midpoint of the amplitude ("y-axis") of the eye diagram, and mark the transition from a logical zero to a logical one, and vice versa. Once the edges 108 are known, then the optimal sampling point for 102 can be determined as the midpoint, in time, between them. The edge sequence 312 represents and tracks the time variation (or phase shift) of the edges over time, so that the optimal sampling point can be continuously updated, as the midpoint between the edges.

The CDR module 314 is essentially capable of moving the phase of the sampling clock 330 to accurately sample data. In this embodiment, the CDR module 314 may have more range than it needs to track the error. Therefore, the excess range is utilized to add jitter (controlled amount of error). This allows for a user to determine bit error rates caused by a certain amount of added jitter signal 324, allowing for a prediction and calculation of the timing margin. The CDR module 314 includes a phase detector 316 and a combination loop filter and summer module 320.

The phase detector 316 compares the estimated digital sequence 310 and the edge sequence 312 to provide an error signal 318. The error signal 318 indicates whether the first data latch 306 is sampling the digital signal 304 before its optimal sampling time, namely early, at its optimal sampling time, or after its optimal sampling time, namely late. For example, the phase detector 316 compares edges of the estimated digital sequence 310 with corresponding portions of the edge sequence 312 to determine whether the edges of the estimated digital sequence 310 and the corresponding portions of the edge sequence 312 are aligned in time. The phase detector 316 provides the error signal 318 that is indicative of a difference in phase between the edges of the estimated digital sequence 310 and the corresponding portions of the edge sequence 312.

Absent the jitter stressor 322, the CDR module 314 adjusts the phase of the sampling clock 330 using the error signal 318 to cause the first data latch 306 to sample the digital signal 304 closer to, or at, its optimal sampling time. Specifically, without the jitter stressor signal 324, the loop filter 319 smooths the error signal 318 to provide a phase control signal 326 to the phase controller 328. The phase controller 328 then generates/adjusts the phase of the sampling clock 330 to correct for any variation in the edges of the edge sequence 312, and thereby phase correct the sampling clock 303 to sample at the optimum sampling time.

With the jitter stressor 322 and corresponding signal 324, the combination loop filter and summer module 320 combines the error signal 318 and a jitter signal 324 in the summer 321 to provide a sampling clock phase control 326 to allow for determination of the timing margin of the timing margin calculation system 300. Specifically, the jitter signal 324 provides an intentional phase shift in the sampling time of the sampling clock 330, such that the first data latch 306 samples the digital signal 304 at a sub-optimal sampling time (e.g. early or late). The amount of jitter is controllable by the jitter stressor 322, where the jitter can be incrementally increased until the BER due to increased jitter becomes unacceptable. The closer the sampling clock is to optimal without any jitter, the more jitter the system can accept before an unacceptable BER threshold is crossed. Hence, the amount of intentional jitter 324 that is necessary to reach an unacceptable BER is a measure of the timing margin of the CDR 314, and the overall receiver 303.

The phase controller 328 controls the phase of the sampling clock signal 330 in response to the sampling clock phase control 326. The phase controller 328 may advance or regress the phase of the sampling clock signal 330 in response to the sampling clock phase control 326. In an exemplary embodiment, the phase controller 328 may advance or regress phase of the sampling clock signal 330 by $\frac{1}{32}$ or $\frac{1}{64}$ of a bit period.

The jitter stressor 322 provides the jitter signal 324. Various jitter waveforms can be generated for the jitter signal 324 to test the CDR 314 under various conditions. In an exemplary embodiment, the jitter signal 324 can be of saw-tooth profile, sinusoidal jitter or one-sided jitter to measure early and late margins. Typically, the jitter signal 324 causes the first data latch 306 to sample the digital signal 304 before its optimal sampling time, namely early, and/or after its optimal sampling time, namely late. In another exemplary embodiment, the amount of the jitter signal 324 added by the jitter stressor 322 does not affect the edge determination of the eye diagram by the data latch 312. This is so because the application of the jitter signal 324 is sufficiently intermittent and self-correcting about zero, that the edge determination is unable to follow the phase shift in the sampling signal 330, and therefore unaffected.

The evaluator module 332 compares the estimated digital sequence 310 with the a priori known sequence of the digital signal 304. The evaluator module 332 compares each bit of the estimated digital sequence 310 with a corresponding bit from the a priori known sequence of the digital signal 304 to determine whether these two bits match. If these bits do not match, the evaluator module 332 indicates that a bit error has been made during the estimation of the digital signal 304. In an exemplary embodiment, a pseudorandom binary sequence (PRBS) checker or a bit error rate tester (BERT) may be utilized as the evaluator module 332 to detect bit errors. The evaluator module 332 provides a jitter stressor control 334 to iteratively increase the jitter signal 324 to adjust the sampling clock signal 330 until an unacceptable amount of bit errors occurs in the estimated digital sequence 310. Typically, the unacceptable amount of errors occurs when a number of bit errors as indicated by evaluator module 332 reaches a predefined threshold, or BER. The difference between the optimal sampling time and the sampling time having enough jitter to cause the unacceptable amount of bit errors represents a timing margin of the digital signal 304.

The advantage of the above system is that it does not require duplicate receiver hardware, as in conventional systems where one data path is compared against another. Instead, an a priori sequence is generated, and the receiver timing margin can be checked on its own without another hardware reference. The jitter, serving as an error term is added moving the phase of the sampling clock to be early or late. Furthermore, the present disclosure provides the advantage that offline characterization can be made of a receiver before mass production without building parallel hardware. For example, when a receiver is designed and prototyped, the timing margin can be determined for the system before it goes into mass production.

The jitter stressor 322 can generate various waveform types for the jitter signal 324. For example, the amplitude and duration of the jitter signal 324 can be manipulated using various different waveforms to skew the phase of the sampling clock signal 330, and therefore evaluate the effects of various types of jitter on BER of the receiver. FIGS. 4A-B, 5A-B, 6A-B, and 7A-B illustrate various possible jitter waveforms and their respective effects on the phase of the sampling signal 330.

FIG. 4A illustrates a symmetric waveform for the jitter signal 324 that can be added to skew a phase of the sampling clock signal 330 according to an exemplary embodiment of the present disclosure. As illustrated in FIG. 4A, the jitter stressor output is initially positive until x=6, thereafter it is zero, then negative, then zero and then positive again. FIG. 4B illustrates the effect on a phase of the sampling clock signal 330 by the addition of the jitter signal 324 as illustrated in FIG. 4A. Wherever the jitter signal 324 is zero, the slope (thus the change in the phase of the sampling clock signal 330) is zero, when the output is positive, the slope is positive (thus the change is the phase of the sampling clock signal 330 moves in a positive direction) and when the output is negative, the slope is negative (thus the change in the phase of the sampling clock signal 330 is in a negative direction). As the phases are moved back and forth, bit errors will occur allowing for a calculation of the timing margin. It is noted that the effect on the sampling clock 330 is symmetric about zero over the time duration of the eye diagram, so there is no long term phase shift effect on the data latch 308 that detects the edge sequence 312.

Figure 5A:
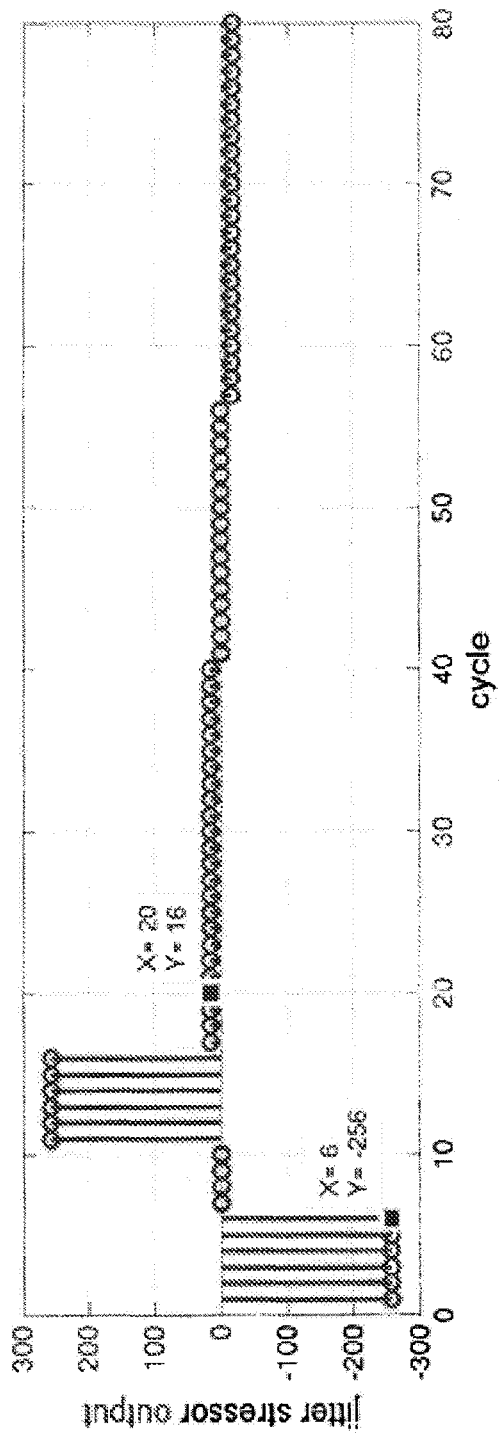
Figure 5B:
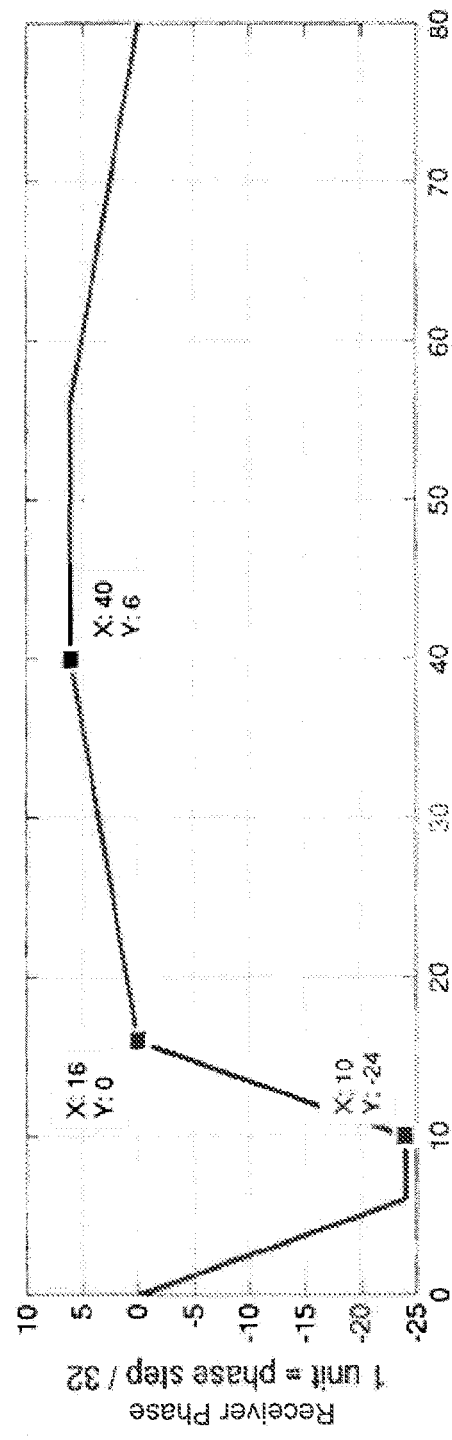

FIG. 5A illustrates asymmetric waveform for the jitter signal 324 that is added to skew the phase of the sampling clock signal according to another exemplary embodiment of the present disclosure. This embodiment of the jitter signal 324 is used to stress one side (early or late) more than the other, but the cumulative effect on the CDR is zero over time. As shown in FIG. 5A, larger amplitudes of jitter are added in a short period time (e.g. $1/10^{th}$ of an eye duration) to move the phase of the sampling clock signal 330 by a significant amount in the negative direction (early or late depending on the reference chosen), with a quick snap back in opposite direction, and then rise a slow rise back to zero. FIG. 5B illustrates the effect on the phase of the sampling clock signal 330 by the addition of the jitter signal 324 as illustrated in FIG. 5A. Again, the long term average on the sampling clock signal 330 over the eye duration (in-time) is substantially zero so as not to effect the edge determination.

Figure 6A:
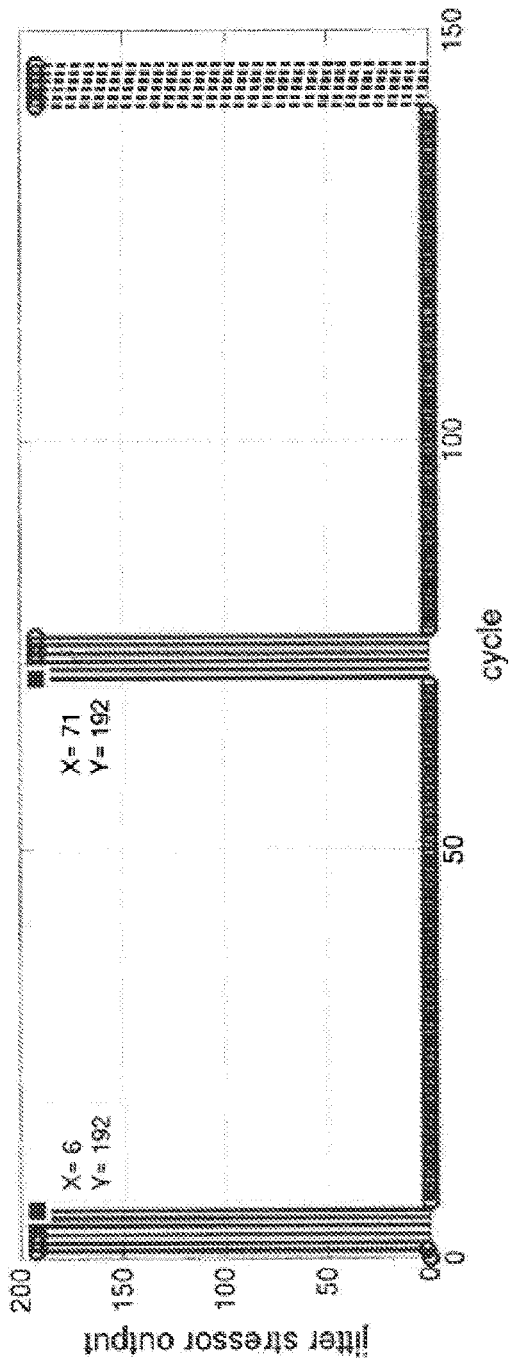
Figure 6B:
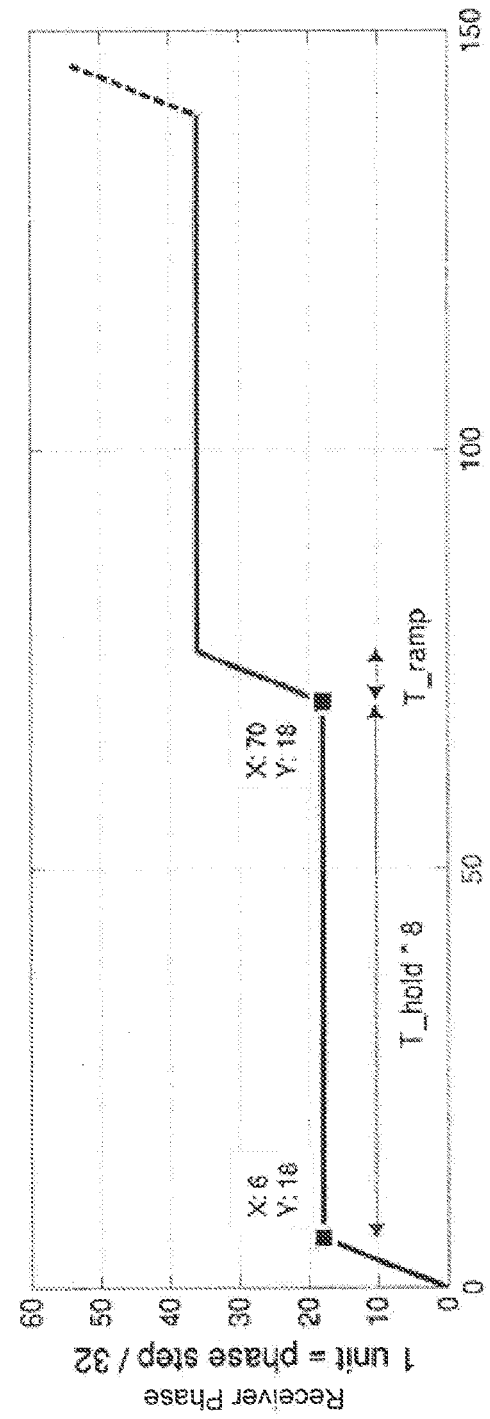

FIG. 6A illustrates another asymmetric waveform for the jitter signal 324 that is added to skew the phase of the sampling clock signal 330 according to another exemplary embodiment of the present disclosure. As illustrated in FIG. 6B, the effect on the phase of the sampling clock signal 330 is that the phase initially moves in a positive direction, then the phase is kept constant at the same level, and then an additional amount of the jitter signal 324 is added, leading to the phase further moving in the positive direction. This would continue until a threshold BER is crossed. The goal is to figure out the maximum jitter that can be added without effecting the phase enough to cause an unacceptable number of bit errors.

Figure 7A:
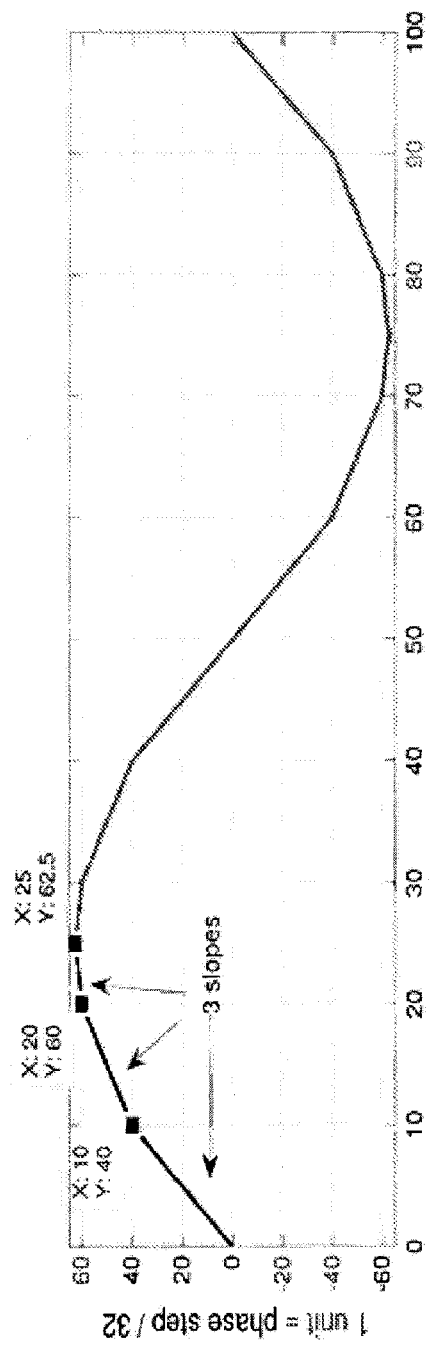
Figure 7B:
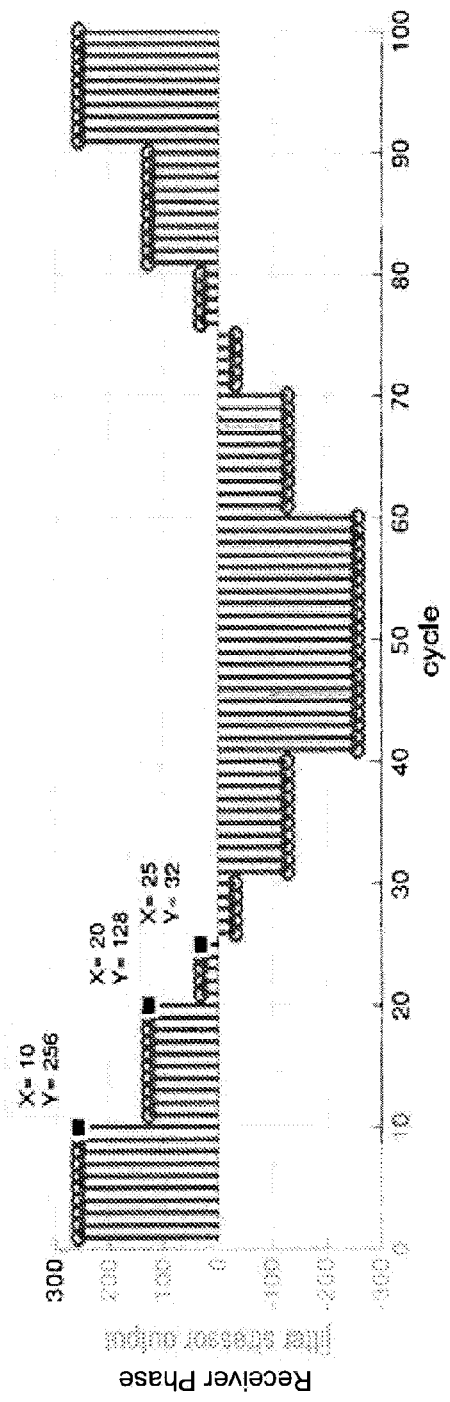

FIG. 7A illustrates a sinusoidal waveform for the jitter signal 324 that is added to skew the phase of the sampling clock signal 330 according to another exemplary embodiment of the present disclosure. A sinusoidal waveform may especially be utilized in a Serializer/Deserializer (SERDES) environment. This is used to estimate an amplitude of the jitter signal 324 that can be tolerated without unduly affecting the number of bit errors in a SERDES receiver. Essentially, for a given frequency of sinusoidal jitter, a user keeps increasing the amplitude of the sine wave of the jitter signal 324 in an iterative fashion, until an unacceptable number of bit errors are detected. In another embodiment, the frequency of the sinusoidal jitter is varied, instead of or in addition to, the amplitude of the sinusoidal jitter. FIG. 7B illustrates the effect on the phase of the sampling clock signal 330 by the addition of the jitter stressor output that is illustrated in FIG. 7A.

Figure 8A:
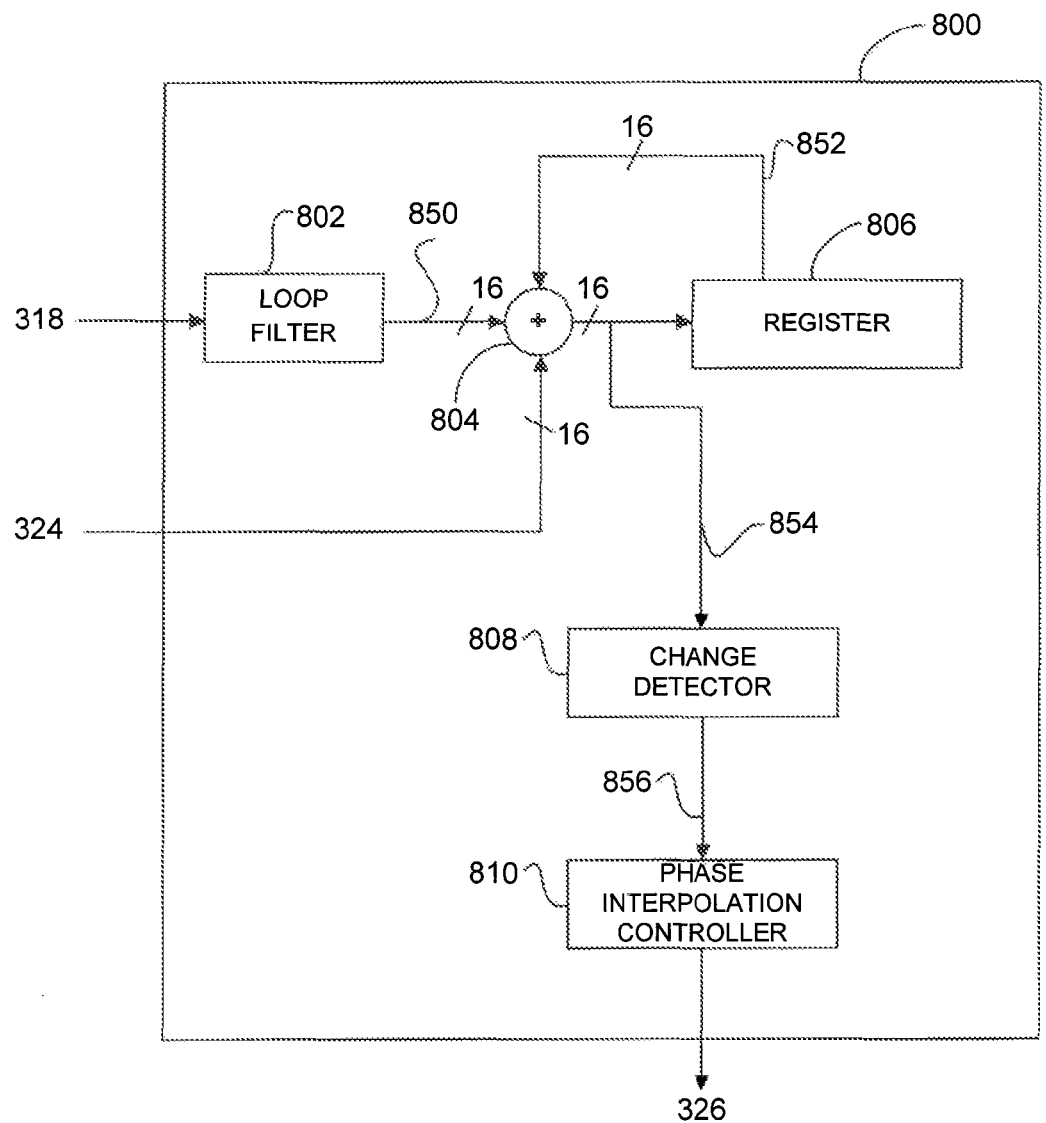
FIGS. 8A-8B illustrate a block diagram of a combination loop filter and summer module according to an exemplary embodiments of the present disclosure.

FIG. 8 illustrates a block diagram of a combination loop filter and summer module 800 that is one example embodiment of the combination loop filter and summer module 320, according to an exemplary embodiment of the present disclosure. In addition to the description above, the combination loop filter and summer module 800 further determines whether a phase of the sampling clock signal 330, should be adjusted to sample the digital signal 304 closer to its optimal sampling time in the digital domain, as will described herein. The module 800 includes a loop filter 802, a summer 804, a register 806, a change detector 808, and a phase interpolator controller 810.

The loop filter 802 filters the error signal 318 to smoothen or average the error signal 318 to provide a filtered error signal 850. The loop filter 802 could be a lowpass filter or bandpass filter as will be understood by those skilled in the arts. In an exemplary embodiment, the error signal 318 represents a discrete-time signal. Typically, in this exemplary embodiment, the loop filter 802 represents a digital filter, such as an infinite impulse response (IIR) filter or a finite impulse response filter (FIR) to provide some examples that reduces or enhances certain aspects of the error signal 318 to smoothen or average it to provide the filtered error signal 850. In another exemplary embodiment, the error signal 318 represents a sixteen (16) bit, or two (2) byte, digital word that is filtered by the filter 802 to provide another sixteen (16) bit digital word as the filtered error signal 850.

The summer 804 combines the jitter signal 324, the filtered error signal 850, and a previous sampling clock signal 852 to provide a jitter latent error signal 854. In an exemplary embodiment, the summer module 804 combines a first sixteen (16) bit digital word that represents the jitter signal 324, a second sixteen (16) bit digital word that represents the filtered error signal 850, and a third sixteen (16) bit digital word that represents the previous sampling clock signal 852 to provide a fourth sixteen (16) bit digital word as the jitter latent error signal 854.

The register 806 stores a digital value, typically, a second sixteen (16) bit digital word, indicative of a state of the jitter latent error signal 854. For example, the state may represent an actual digital value of a phase of the jitter latent error signal 854 at an instance in time. The register 806 provides the stored digital value at the previous sampling clock signal 852 and stores another digital value based upon the jitter latent error signal 854.

The change detector 808 compares a portion, such as one or more most significant bits, of the jitter latent error signal 854 with a previous portion of the jitter latent error signal 854 to determine a phase adjustment 856. For example, the change detector 808 may compare the five (5) most significant bits of the jitter latent error signal 854 with a previous five (5) most significant bits of the jitter latent error signal 854. The change detector 808 may provide a first value for the phase adjustment 856 when the portion of the jitter latent error signal 854 is less than the previous portion. The first value causes the phase of the sampling clock signal 330 to be decreased. The change detector 808 may provide a second value for the phase adjustment 856 when the portion of the jitter latent error signal 854 is greater than the previous portion. The second value causes the phase of the sampling clock signal 330 to be increased.

The phase interpolator controller 810 provides the sampling clock phase control 326 in response to the phase adjustment 856. Typically, the phase interpolator controller 410 positions the phase of the sampling clock signal 330 using the sampling clock phase control 326. The phase interpolator controller 410 may advance or regress the phase of the sampling clock signal 330 in response to the phase adjustment 856. In an exemplary embodiment, the phase interpolator controller 410 may advance or regress the phase of the sampling clock signal 330 by $1/32$ or $1/64$ of a bit period.

Figure 8B:
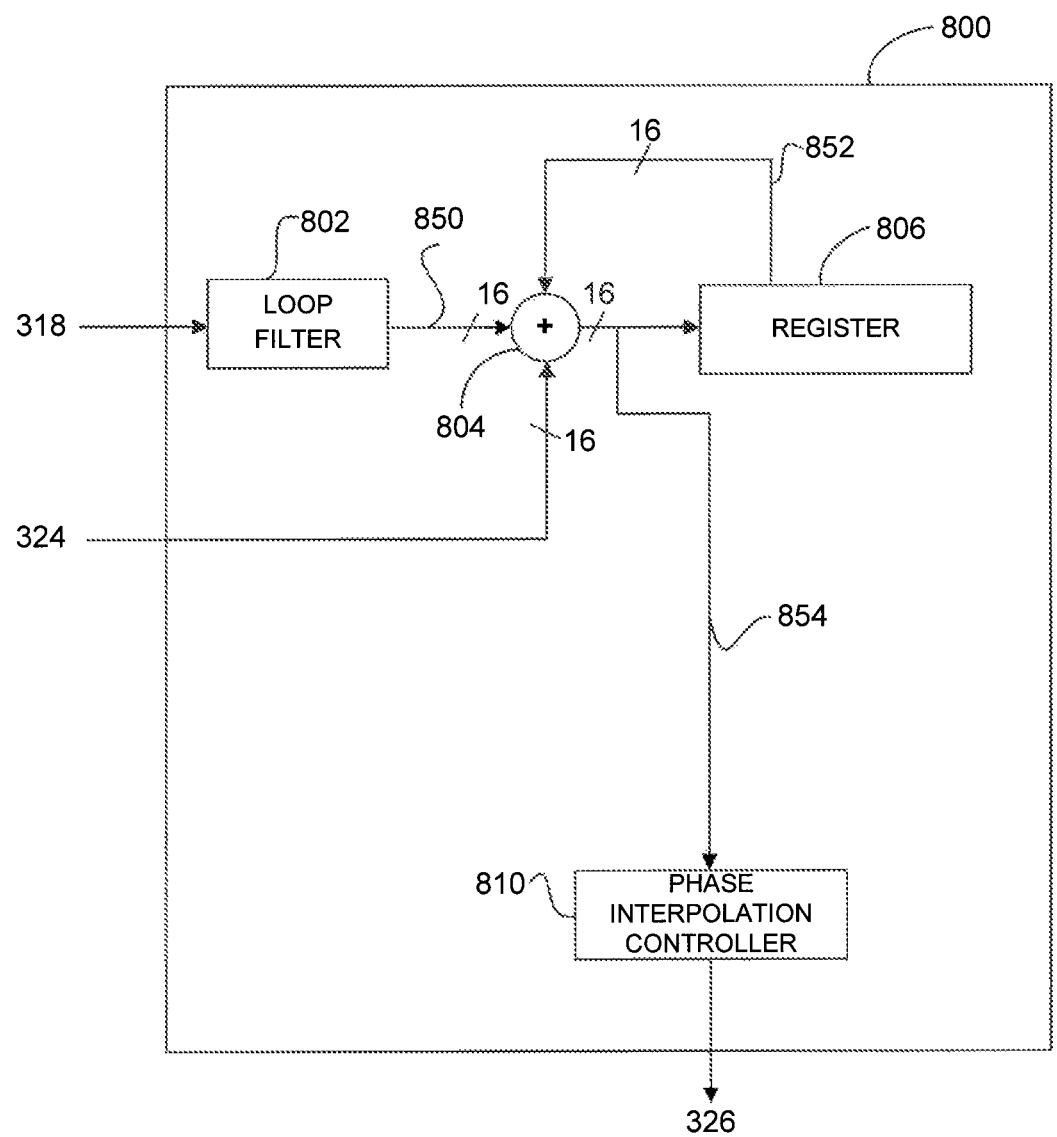

In another exemplary embodiment shown in FIG. 8B, the summer module 804 combines a first sixteen (16) bit digital word that represents the jitter signal 324, a second sixteen (16) bit digital word that represents the filtered error signal 850, and eleven (11) bits from a digital word that represents a portion of the previous sampling clock signal 852 to provide a fourth sixteen (16) bit digital word as the jitter latent error signal 854. In this example, the register 806 stores a digital value, typically, eleven (11) bits representing a portion of a second sixteen (16) bit digital word, indicative of a state of the jitter latent error signal 854. For example, the state may represent an actual digital value of a phase of the jitter latent error signal 854 at an instance in time. The register 806 provides the stored digital value limited to eleven (11) bits at the previous sampling clock signal 852 and stores another digital value limited to eleven (11) bits based upon the jitter latent error signal 854.

Accordingly, the embodiment in FIG. 8B bypasses the change detector 808, and uses upper five (5) bits from the latent error signal 852 to produce a first or a second respective value for the phase adjustment 856. To produce the first and second values, the upper five (5) bits may in effect be compared with zeros. The first value causes the phase of the sampling clock signal 330 to be decreased while the second value causes the phase of the sampling clock signal 330 to be increased. Essentially, based on only the upper five (5) bits from the latent error signal 852, the phase of the sampling clock signal 330 may be increased or decreased.

Figure 9:
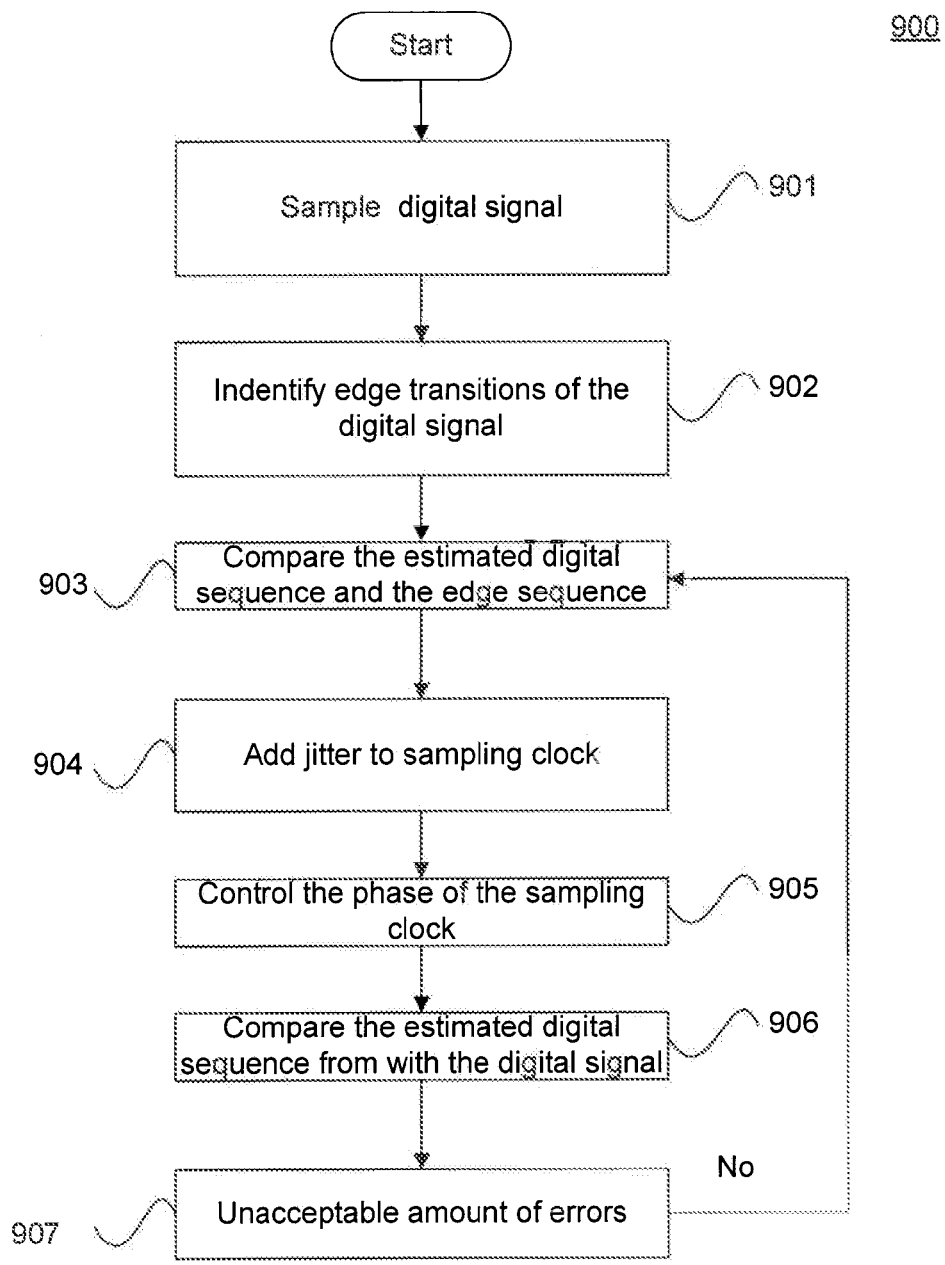
FIG. 9 is a flowchart of exemplary operational steps of a method of calculating the timing margin according to an exemplary embodiment of the present disclosure.

FIG. 9 is a flowchart 900 of exemplary operational steps of a method of calculating the timing margin according to an exemplary embodiment of the present disclosure. The disclosure is not limited to this operational description. Rather, it will be apparent to persons skilled in the relevant art(s) from the teachings herein that other operational control flows are within the scope and spirit of the present disclosure. The following discussion describes the steps in FIG. 9

At step 901, the operational control flow samples a digital signal in accordance with a sampling clock signal to provide an estimated digital sequence. The operational control flow estimates whether the digital signal is the logical one or the logical zero in accordance with the sampling clock signal.

At step 902, the operational control flow identifies edge transitions of the digital signal in accordance with the sampling clock signal to provide an edge sequence that is indicative of transitions between logic values of the digital signal, and/or edges of the eye diagram.

At step 903, the operational control flow compares the estimated digital sequence from step 901 and the edge sequence from step 902 to provide an error signal. The error signal indicates whether the operational control is sampling the digital signal from step 901 before its optimal sampling time, namely early, at its optimal sampling time, and/or after its optimal sampling time, namely late.

At step 904, the operational control flow adds jitter to the error signal from step 903 to provide a sampling clock signal phase control.

At step 905, the operational control flow controls the phase of the sampling clock signal from step 901 in response to the sampling clock signal phase control from step 904.

At step 906, the operational control flow compares the estimated digital sequence from step 901 with the digital signal from step 901. The operational control flow compares each bit of the estimated digital sequence from step 901 with a corresponding bit from the a priori known sequence of the digital signal from step 901 to determine whether these two bits match. If these bits do not match, the operational control flow indicates that a bit error has been made during the estimation of the digital signal in step 901.

At step 907, the operational control flow reverts to step 901 to iteratively increase the jitter until a number of the bit errors from 906 reaches unacceptable amount of errors. The operational control flow compares the number of the bit errors from 906 with a threshold and reverts to step 901 until the number of the bit errors from 906 is greater than equal to the threshold. Typically, the unacceptable amount of errors occurs when the number of bit errors is greater than or equal to a predefined BER threshold. The difference between the optimal sampling time and the sampling time having enough jitter to cause the unacceptable amount of bit errors, represents a timing margin for the receiver under test.

It would be apparent to persons skilled in the art(s) that some of the operational steps or part thereof described above of a method of calculating the timing margin may be conducted at a bit level or a user software level. For example, at step 904, the decision and command to add jitter is made at a user software level but the jitter is added to a sampling clock at a bit level. More specifically, the bit error rate is calculated, and then an amount of jitter is determined at a user software level based on the bit error rate. However, the addition of jitter is a bit level operation and preferably occurs at a bit level.

CONCLUSION

It is to be appreciated that the Detailed Description section, and not the Abstract section, is intended to be used to interpret the claims. The Abstract section may set forth one or more but not all exemplary embodiments of the present disclosure as contemplated by the inventors, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An apparatus for calculating timing margin in a clock and data recovery (CDR) system, comprising:
    a first data latch configured to sample a digital signal in accordance with a sampling clock signal to provide an estimated digital sequence;
    a second data latch configured to identify edge transitions of the digital signal in accordance with the sampling clock signal to provide an edge sequence;
    a phase detector configured to compare the estimated digital sequence and the edge sequence to provide an error signal;
    a summer configured to combine the error signal and a jitter signal to provide a sampling clock signal phase control;
    a jitter signal stressor configured to provide the jitter signal in response to a jitter signal stressor control;

a phase controller configured to adjust a phase of the sampling clock signal in response to the sampling clock signal phase control; and an evaluator module configured to compare the estimated digital sequence with the digital signal and to cause an increase in the jitter signal until a number of bit errors generated by the first data latch is greater than or equal to a threshold value.

2. The apparatus of claim 1, wherein the digital signal represents a sequence of logical ones and zeros that are a priori known to the CDR system.

3. The apparatus of claim 1, wherein the first data latch is configured to estimate whether the digital signal is a logical one or a logical zero in accordance with the sampling clock signal.

4. The apparatus of claim 1, further comprising:
a register configured to store a digital value representing a previous phase of the sampling clock signal, and wherein the summer is configured to combine the error signal, the jitter signal, and the digital value to provide a jitter latent error signal;
a change detector configured to compare a portion of the jitter latent error signal with a previous portion of the jitter latent error signal to provide a phase adjustment; and
a phase interpolator controller configured to provide the sampling clock signal phase control in response to the phase adjustment.

5. The apparatus of claim 4, further comprising:
a loop filter configured to filter the error signal.

6. The apparatus of claim 4, wherein the portion of the jitter latent error signal includes a first group of most significant bits of the jitter latent error signal and wherein the previous portion of the jitter latent error signal includes a second group of most significant bits of the jitter latent error signal, the first group and the second group of significant bits having a substantially similar number of bits.

7. The apparatus of claim 4, wherein the change detector is further configured to provide the phase adjustment having a first value when the portion of the jitter latent error signal is less than the previous portion of the jitter latent error signal and a second value when the portion of the jitter latent error signal is greater than the previous portion of the jitter latent error signal.

8. The apparatus of claim 7, wherein the phase interpolator controller is further configured to regress the phase of the sampling clock signal when the phase adjustment signal is at the first level and to advance the phase of the sampling clock signal when the phase adjustment signal is at the second level.

9. The apparatus of claim 1, further comprising:
a register configured to store a digital value representing a portion of a previous phase of the sampling clock signal, and wherein the summer is configured to combine the error signal, the jitter signal, and the digital value to provide a jitter latent error signal;
a phase adjuster configured to provide a phase adjustment based on a portion of the jitter latent error signal; and
a phase interpolator controller configured to provide the sampling clock signal phase control in response to the phase adjustment.

10. The apparatus of claim 1, wherein the jitter signal is characterized as being selected from a group consisting of:
a saw-tooth profile;
a sinusoidal jitter signal; and
a one-sided jitter signal.

11. The apparatus of claim 1, wherein the evaluator module is further configured to calculate a timing margin of the CDR system when the number of bit errors generated by the first data latch is greater than or equal to the threshold value.

12. A method for calculating timing margin in a clock and data recovery (CDR) system, comprising:
sampling a digital signal in accordance with a sampling clock signal to provide an estimated digital sequence;
identifying edge transitions of the digital signal in accordance with the sampling clock signal to provide an edge sequence;
comparing the estimated digital sequence and the edge sequence to provide an error signal;
combining the error signal and a jitter signal to provide a sampling clock signal phase control;
adjusting a phase of the sampling clock signal in response to the sampling clock signal phase control;
comparing the estimated digital sequence and the digital sequence to determine a number of bit errors; and
increasing the jitter signal until the number of bit errors is greater than or equal to a threshold value.

13. The method of claim 12, wherein the digital signal represents a sequence of logical ones and zeros that are a priori known to the CDR system.

14. The method of claim 12, wherein the sampling comprises:
estimating whether the digital signal is a logical one or a logical zero in accordance with the sampling clock signal.

15. The method of claim 12, wherein the combining comprises:
storing a digital value representing a previous phase of the sampling clock signal;
combining the error signal, the jitter signal, and the digital value to provide a jitter latent error signal, and wherein the adjusting comprises:
comparing a portion of the jitter latent error signal with a previous portion of the jitter latent error signal to provide a phase adjustment; and
providing the sampling clock signal phase control in response to the phase adjustment.

16. The method of claim 15, further comprising:
filtering the error signal.

17. The method of claim 15, wherein the portion of the jitter latent error signal includes a first group of most significant bits of the jitter latent error signal and wherein the previous portion of the jitter latent error signal includes a second group of most significant bits of the jitter latent error signal, the first group and the second group of most significant bits having a substantially similar number of bits.

18. The method of claim 15, wherein the comparing a portion of the jitter latent error signal, with, a previous portion of the jitter latent, error signal comprises:
providing the phase adjustment having a first value when the portion of the jitter latent error signal is less than the previous portion of the jitter latent error signal and a second value when the portion of the jitter latent error signal is greater than the previous portion of the jitter latent error signal.

19. The method of claim 18, wherein the providing the sampling clock signal phase control comprises:
regressing the phase of the sampling clock signal when the phase adjustment signal is at the first level; and
advancing the phase of the sampling clock signal when the phase adjustment signal is at the second level.

20. The method of claim 12, wherein the combining comprises:
storing a digital value representing a portion of a previous phase of the sampling clock signal;

combining the error signal, the jitter signal, and the digital value to provide a jitter latent error signal, and wherein the adjusting comprises:
providing a phase adjustment based on a portion of the jitter latent error signal; and
providing the sampling clock signal phase control in response to the phase adjustment.

21. The method of claim 12, wherein the jitter signal is characterized as being selected from a group consisting of:
a saw-tooth profile;
a sinusoidal jitter signal; and
a one-sided jitter signal.

22. The method of claim 12, further comprising:
calculating a timing margin of the CDR system when the number of bit errors is greater than or equal to the threshold value.

* * * * *

UNITED STATES PATENT AND TRADEMARK OFFICE
CERTIFICATE OF CORRECTION

PATENT NO.        : 8,751,880 B2                                        Page 1 of 1
APPLICATION NO.   : 13/341614
DATED             : June 10, 2014
INVENTOR(S)       : Valliappan et al.

It is certified that error appears in the above-identified patent and that said Letters Patent is hereby corrected as shown below:

In the Claims:

In column 12, line 50, claim 18, please replace "signal, with, a" with --signal with a--.

In column 12, line 51, claim 18, please replace "latent, error" with --latent error--.

Signed and Sealed this
Thirtieth Day of September, 2014

Michelle K. Lee
*Deputy Director of the United States Patent and Trademark Office*